Aug. 16, 1938.   R. CHILTON   2,127,462
ROCKING DYNAMIC DAMPER
Filed Aug. 19, 1936
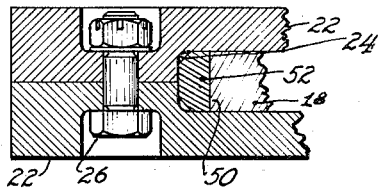
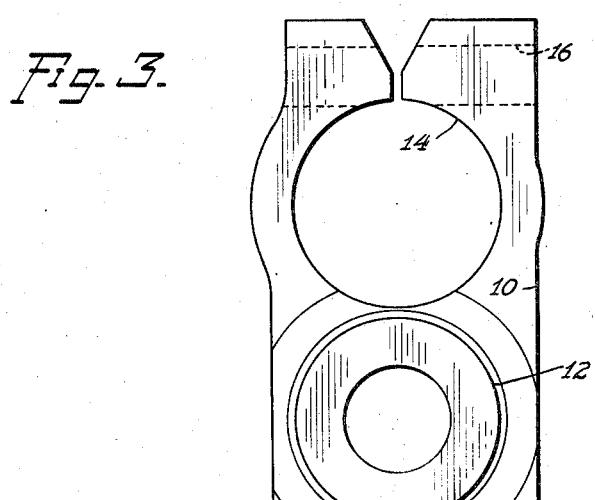
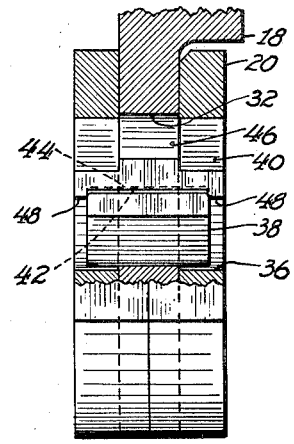
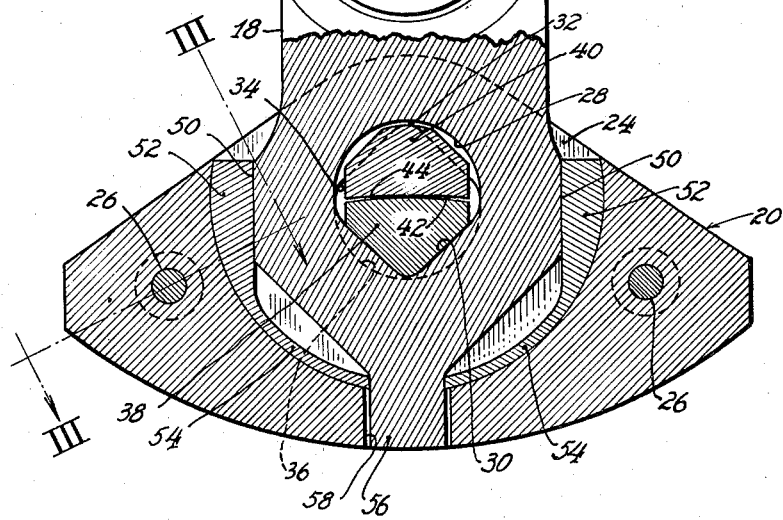
ROLAND CHILTON, INVENTOR.
BY  *W. E. Nack*
ATTORNEY.

Patented Aug. 16, 1938

2,127,462

UNITED STATES PATENT OFFICE 2,127,462

ROCKING DYNAMIC DAMPER

Roland Chilton, Ridgewood, N. J., assignor, by mesne assignments, to Wright Aeronautical Corporation, Paterson, N. J., a corporation of New York Application August 19, 1936, Serial No. 96,760

12 Claims. (Cl. 74—604)

This invention relates to dynamic dampers for eliminating torque variations from shaft systems and in certain respects comprises improvements in the dynamic damper shown in my copending application, Serial 41,541.

A shaft system having masses thereon has certain natural periods of torsional vibration and, during rotation, should it be subjected to torsional impulses in synchronism with such vibration, destructive vibrations due to resonance are built up. It is known that if a pendulum synchronous with the frequency of the torsional impulses be applied to a shaft system, the pendulum will swing 180° out of phase with the torsional impulses and that the amplitude of movement of the pendulum will increase until the dynamic torque variations exerted by the pendulum balances the input torque variation. Particularly in the case of crankshafts for combustion engines, the imposed torque variations vary with rotational speed. For instance, the principal torque variation on a nine cylinder 4-stroke-cycle radial cylinder engine has a frequency of 4½ per revolution. It is further known that when a pendulum is attached to a rotated shaft system, so as to be stabilized by centrifugal force without material frictional damping, the natural frequency of the pendulum increases with the rotational speed. That is, a pendulum having a given length makes a constant number of swings per revolution regardless of the rotational speed. In the copending application above mentioned, is shown a species of pendulum counterweight which is endowed with the characteristic of a constant frequency per shaft revolution by virtue of mutually contacting rocker faces on the shaft and counterweight, the relative convexity of the rocker faces being the determining factor in establishing the frequency of the counterweight.

To be effective in aircraft engines, a considerable mass is needed in the movable counterweight and in the case of radial engines, it is very convenient and desirable to use the existing conventional counterweight as the dynamic torque damping mass, since this involves no increase in weight.

An object of this invention is to provide an improved means for supporting a counterweight mass upon a shaft member in such a manner that it comprises a dynamic torsional damper.

A further object is to so relate the mutually contacting faces of the crankshaft and counterweight members as to minimize the tendency toward sliding contact therebetween, whereby pure rolling contact with consequent reduction of friction results.

Still another object is to locate the mutually contacting rocker faces whereby stresses in the several members are held to a minimum and whereby the length of the rockably contacting bearing surface is at a maximum.

Other objects and advantages of the invention will be obvious from or will be pointed out in the following description with reference to the drawing in which—

Fig. 1 is an end view, partly in section, of a crankshaft embodying the device,

Fig. 2 is a fragmentary axial section through a portion of the crankshaft, and

Fig. 3 is a detailed section on the line 3—3 of Fig. 1.

In these figures the crankcheek 10 is provided with a journal and with an opening 14 within which the crankpin of a crankshaft is adapted to be clamped by a bolt passing through a hole 16 provided therefor, the crankcheek 10 having a counterweight carrying extension 18 formed as a continuation thereof on the opposite side of the journal 12.

A counterweight 20 comprises similar halves 22—22, each having a circular recess 24 so that, when the halves are attached to one another by bolts 26 the extension 18 is embraced by the counterweight 20, the extension lying within the recesses 24. The extension 18 is pierced by an opening 28, comprising, as to its outer portion, V shaped sides 30, and as to its inner portion a substantially semi-circular clearance profile 32. Similar holes, but inverted, are formed in the counterweight 20, these comprising V sides 34 and a clearance profile 36. Blocks 38 and 40 each have V shaped faces respectively engaged by V sides 30, 34 of the extension and counterweight holes, these V sides respectively clearing the clearance profiles 36, 32. The opposite sides of the blocks are provided with contacting rocker faces 42, 44 which are relatively convex. Preferably, both faces 42 and 44 are arcuate, being struck on different radii from centers lying outside of the mass, and preferably these centers lie radially outward of the mass with respect to the shaft center. These rocker faces permit of rolling contact shift as the counterweight moves relative to the extension 18. It is upon the degree of relative arcuity of the faces 42 and 44 that the frequency of oscillation of the mass depends.

The blocks 38, 40 suspend the mass 20, providing a mounting of great strength to resist centrifugal force, the faces 42, 44 being held in contact by this force. Scribing the arcs of the faces 42, 44 from centers radially outwardly of the mass, tends to reduce the lateral forces between the mass and extension which would induce relative sliding of the faces 42, 44 which sliding, if it were permitted, would upset proper operation of the device.

It will be noted that the blocks 38, 40 are substantially coextensive in length with the mass thickness of the counterweight, and the line of rocking contact may be made of almost the same length as the thickness of the counterweight, whereby the stress intensity between the rocking faces is materially reduced as compared to the arrangement shown in said prior application.

To provide for axial location of the blocks 38, 40 in the assembly, the block 40 is provided with a shoulder 46 extending inwardly of the V sides 34, within the clearance profile 28 of the hole in the shaft extension 18. However, this shoulder 46 is in clearance relation with respect to the extension 18. The block 38 is located axially with the block 40 by the provision of end shoulders 48 on the block 40 which shoulders overlap the end of the block 38 to hold the latter from possible displacement. Assembly of the apparatus is effected by placing the blocks 38 and 40 in their proper relationship, then assembling the counterweight halves 22 around extension 18 and then applying the bolts 26.

The frequency of the counterweight is a function of the relative convexity of the rocker faces 42 and 44, the period becoming faster as the relative convexity of the faces becomes less. By a suitable relationship of the radii on which the faces 42 and 44 are struck, any desired frequency may be obtained notwithstanding the magnitude of the polar moment of inertia of the weight. For any given frequency, the difference between the radii will be reduced as the polar moment of the weight is increased. The required radius relation further varies with the distance from the center of gravity of the weight to the center of rotation of the shaft, and also with the distance from the center of gravity of the weight to the rocker faces themselves. The mathematics of these relationships is somewhat involved and, therefore, is not included in the specification. However, the desired radii may, of course, be obtained by trial and error methods, since the desired frequency is always known. It has been found advantageous in this rocking type of damper to dispose the rocking faces on the crankshaft center side of the center of gravity of the weight, as is shown in the drawing. It is partly for this reason that the mounting devices of the invention are utilized to provide an adequate attachment.

It is important to note that the term "rocking contact" as used in this specification and in the appended claims is intended to distinguish from the opposite case of sliding contact. Thus, in any conventional pivot joint consisting of a pin fitted in a hole, pivotal movement can only result from sliding of one surface over the other, involving sliding friction. In the present invention the rocker faces roll on one another on angular displacement of the weight, with no relative sliding whatever. The difference between this rocker form of support and a conventional hole-pin connection is analogous to the difference between the roller bearing and an ordinary sliding plain bearing, and the resultant anti-friction properties of the rolling contact comprises an object of the invention.

It will be understood that the suspension means has to withstand very large centrifugal force, on the order of 10 tons in the case of the particular engine to which the embodiment shown in the drawing is directed. At full engine speed, the pendulum will perform some nine thousand cycles per minute, and it is important that there be a minimum of friction damping in the counterweight suspension system. The required amplitude of polar movement of the counterweight is low, less than 1° in the specific embodiment illustrated, but the proportions are such that even this small angular movement of the counterweight results in a relatively great contact shift at the rocker faces 42, 44, whereby, as the contact shifts relative to the center of gravity of the counterweight, a large restoring moment is immediately established.

It is desirable to provide means for preventing relative sliding of the rocker faces 42, 44 when the device is stationary, starting, or stopping since under these circumstances the stabilizing effect of centrifugal force to hold the counterweight in its proper position is lacking. I, therefore, provide the crankshaft extension 18 with parallel bearing faces 50 and between these faces and the circular border of the recesses 24 there are loosely inserted segmental locating blocks 52 having arcuate extensions 54 bearing at their ends on an extension 56 of the member 18, said extension 56 being accommodated, with clearance, in a slot 58 formed in the counterweight 20. The slot 58 and the element 56 limit the extreme swing of the counterweight during handling or assembly, or when the engine is starting or stopping but in normal operation the angular swing of the counterweight will be insufficient to produce contact between the element 56 and the counterweight at 58. It should be emphasized that the locating blocks 52 do not participate in the dynamic function of the counterweight. They are merely a locating means to prevent the sliding of one rocker face upon the other (42, 44). It will be seen that the counterweight is free to oscillate relative to the blocks 52 by virtue of the circular contact between the counterweight and the blocks. The blocks 52 are also free to move radially on the parallel bearing faces 50 of the extension 18. This last motion is necessary because there is a very slight lifting of the counterweight toward the center of the crankshaft as the contact point between the rocking faces 42 and 44 moves away from the center point. The center of the upper rocker 44 actually would describe an involute curve. With the maximum angle of swing being on the order of 1 degree, the vertical movement of the center point of the rocker face 44 is only a very small fraction of an inch, which movement in practice is indistinguishable from a vertical line through the center of the face 44. The lateral departure of this center point from the center of the face 42 will be much less than .001", which dimension will be exceeded by the normal running clearance between the blocks 52 and their adjacent bearing surfaces 50. Consequently it will be appreciated that the blocks 52 will have virtually no dynamic effect nor will they contact with their coacting elements under any harmful degree of pressure during operation, their function being to prevent displacement of the counterweight relative to the extension 18 when the counterweight is not subjected to centrifugal force.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. A damper for a shaft having an arm extending therefrom, said arm having an opening, comprising a counterweight mass embracing said arm, said mass having a through opening approximately alined with said arm opening, and a pair of relatively convex abutting blocks extending through said openings, one of said pair being seated in the mass and having clearance relative to the arm, and the other of said pair being seated in the arm and having clearance relative to the mass, said blocks serving as the sole means of restraining said mass against centrifugal displacement under shaft rotation and rendering said weight and shaft relatively movable due to contact shift across the relatively convex rocking faces of said blocks.

2. A damper for a shaft having an arm extending therefrom, said arm having an opening, comprising a counterweight mass embracing said arm, said mass having a through opening approximately alined with said arm opening, a pair of relatively convex abutting blocks extending through said openings, one of said pair being seated in the mass and having clearance relative to the arm, and the other of said pair being seated in the arm and having clearance relative to the mass, said blocks serving as the sole means of restraining said mass against centrifugal displacement under shaft rotation and rendering said weight and shaft relatively movable due to contact shift across the relatively convex rocking faces of said blocks, and means for restraining said blocks from relative axial displacement.

3. A damper for a shaft having an arm extending therefrom, said arm having an opening, comprising a counterweight mass embracing said arm, said mass having a through opening approximately alined with said arm opening, and a pair of relatively convex abutting blocks extending through said openings, one of said pair being seated in the mass and having clearance relative to the arm, and the other of said pair being seated in the arm and having clearance relative to the mass, said blocks serving as the sole means of restraining said mass against centrifugal displacement under shaft rotation and rendering said weight and shaft relatively movable due to contact shift across the relatively convex rocking faces of said blocks, said abutting faces being on the shaft center side of the center of gravity of said mass.

4. A damper for a shaft having an arm extending therefrom, said arm having an opening, comprising a counterweight mass embracing said arm, said mass having a through opening approximately alined with said arm opening, a pair of relatively convex abutting blocks extending through said openings, one of said pair being seated in the mass and having clearance relative to the arm, and the other of said pair being seated in the arm and having clearance relative to the mass, said blocks serving as the sole means of restraining said mass against centrifugal displacement under shaft rotation and rendering said weight and shaft relatively movable due to contact shift across the relatively convex rocking faces of said blocks, and means between said arm and mass to restrain said blocks from relative sliding, confining relative movement between the relatively convex block faces to pure rolling contact.

5. A damper for a shaft having an arm extending therefrom, said arm having an opening, comprising a counterweight mass embracing said arm, said mass having a through opening approximately alined with said arm opening, and a pair of relatively convex abutting blocks extending through said openings, one of said pair being seated in the mass and having clearance relative to the arm, and the other of said pair being seated in the arm and having clearance relative to the mass, said blocks serving as the sole means of restraining said mass against centrifugal displacement under shaft rotation and rendering said weight and shaft relatively movable due to contact shift across the relatively convex rocking faces of said blocks, said relatively convex block faces having a mean radius falling outside the confines of said mass.

6. The combination with a crankshaft extension member and a counterweight member, one embracing the other, of rockably contacted blocks fitting the respective members, said members having holes receiving said blocks, the holes of each member having clearance with respect to the block fitted to the other member.

7. In combination, a crankshaft member, a counterweight member, one embracing the other, blocks engaging the respective members having rockably contacting faces, said faces being differentially arcuate, the arcs thereof being struck from centers radially beyond the counterweight member, relative to the rotation center of the crankshaft, and said faces being on the shaft center side of the center of gravity of said counterweight member.

8. In combination with a crankshaft member and a counterweight member, one slotted to embrace the other, a rocker block embedded in said forked member and spanning said fork and a companion block embedded in and extending on either side of the other member, said blocks being rockably contacted with each other.

9. In combination with a crankshaft member and a counterweight member, one slotted to receive the other, means fitted against movement in the sides of the slotted member and extending across the slot, means fitted against movement in the other member and extending therefrom, said means having rockably contacted surfaces subtending said fitted and extending portions.

10. A crankshaft member and a counterweight member having opposed seats longitudinally offset and rocker blocks fitted against movement in the respective seats, said blocks having rockably related surfaces of mutual contact for supporting said counterweight member against centrifugal force.

11. In combination, a crankshaft member, a counterweight member having its center of gravity radially spaced from the shaft center, one member embracing the other, and a pair of rockably contacting elements fitted to respective members for supporting said members for relative rocking and against centrifugal force, the zone of rocking contact of said elements lying on the shaft center side of the center of gravity of the counterweight member.

12. In a damping device, crankshaft and counterweight members one slotted to embrace the other, and blocks of greater length than the net thickness of either member respectively fitted across said members and rockably contacted one with the other throughout the entire length of at least one said member.

ROLAND CHILTON.